United States Patent [19]
Hirota et al.

[11] Patent Number: 5,406,790
[45] Date of Patent: Apr. 18, 1995

[54] EXHAUST GAS PURIFICATION DEVICE FOR AN ENGINE

[75] Inventors: Shinya Hirota; Yasushi Araki, both of Susono; Kiyoshi Kobashi, Mishima; Tomohiro Oda, Aichi; Fumitada Murakami, Susono, all of Japan

[73] Assignee: Toyota Jidosha Kabushiki Kaisha, Toyota, Japan

[21] Appl. No.: 160,695

[22] Filed: Dec. 2, 1993

[30] Foreign Application Priority Data

Dec. 11, 1992 [JP] Japan .................................. 4-331875
Dec. 29, 1992 [JP] Japan .................................. 4-361571

[51] Int. Cl.⁶ ............................................... F01N 3/20
[52] U.S. Cl. ...................................... 60/276; 60/277; 60/286; 60/301
[58] Field of Search ................ 60/301, 286, 276, 277

[56] References Cited

U.S. PATENT DOCUMENTS

| | | | |
|---|---|---|---|
| 3,716,996 | 2/1973 | Maruoka | 60/286 |
| 3,733,829 | 5/1973 | Henault | 60/301 |
| 3,739,583 | 6/1973 | Tourtellotte | 60/301 |
| 3,810,361 | 5/1974 | Weaving | 60/301 |
| 3,813,226 | 5/1974 | Heitland | 60/301 |
| 3,814,589 | 6/1974 | Heitland | 60/301 |
| 5,207,990 | 5/1993 | Sekiya | 60/286 |

FOREIGN PATENT DOCUMENTS

1334797 10/1973 United Kingdom .................. 60/301

Primary Examiner—James C. Yeung
Assistant Examiner—Daniel J. O'Connor
Attorney, Agent, or Firm—Kenyon & Kenyon

[57] ABSTRACT

A $NO_x$ absorbent which absorbs $NO_x$ in exhaust gas when the air-fuel ratio of the exhaust gas is lean and releases absorbed $NO_x$ when the oxygen concentration of the exhaust gas is lowered, is disposed in an exhaust passage of an engine. When the amount of the $NO_x$ absorbed by the $NO_x$ absorbent is increased, the regenerating process of the $NO_x$ absorbent is performed by supplying a reducing agent to the $NO_x$ absorbent so that the $NO_x$ absorbed by the $NO_x$ absorbent is released and reduced by the reducing agent. Usually, to reduce the amount of the reducing agent required for the regenerating process, the inflowing exhaust gas into the $NO_x$ absorbent is shut off. In the present invention, even in the regenerating process of $NO_x$ absorbent, a small amount of the exhaust gas (carrier gas) is introduced to the $NO_x$ absorbent to carry the supplied reducing agent through the $NO_x$ absorbent to thereby reduce the amount of the reducing agent required for the regenerating process and to shorten the time required to complete the regenerating process.

33 Claims, 11 Drawing Sheets

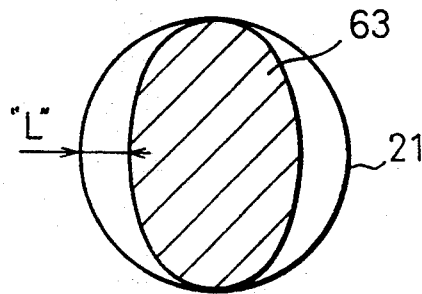
Fig. 5A
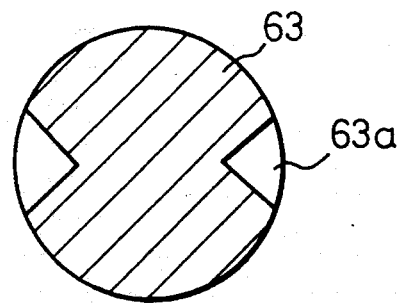
Fig. 5B
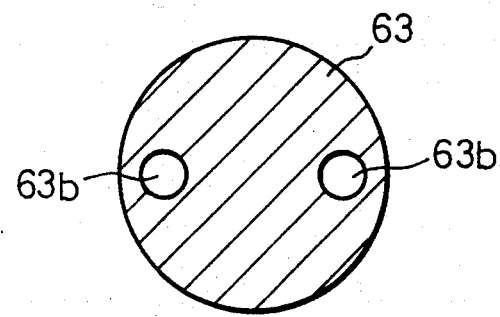
Fig. 5C
Fig. 6
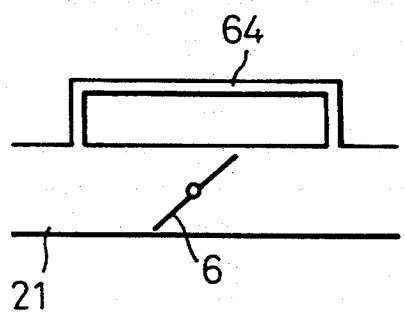

EXHAUST GAS PURIFICATION DEVICE FOR AN ENGINE

BACKGROUND OF THE INVENTION

1. Field of the Invention

The present invention relates to an exhaust gas purification device for an engine. More specifically, the present invention relates to a device which is capable of effectively removing a $NO_x$ component from exhaust gas.

2. Description of the Related Art

A three-way reducing and oxidizing catalyst is generally used as a means for removing pollutants from the exhaust gas of an internal combustion engine. The three-way reducing and oxidizing catalyst can remove three pollutants in the exhaust gas, i.e., CO, HC and $NO_x$ (nitrogen oxide) simultaneously when the air-fuel ratio of the exhaust gas is a stoichiometric air-fuel ratio.

However, it is known that the ability of the three-way reducing and oxidizing catalyst for removing $NO_x$ in the exhaust gas falls rapidly when the air-fuel ratio of the exhaust gas becomes higher than a stoichiometric air-fuel ratio (i.e., becomes leaner). Therefore, in engines operated in a lean air-fuel ratio such as lean burn gasoline engines or diesel engines, it is very difficult to remove $NO_x$ from the exhaust gas the use of three-way reducing and oxidizing catalysts.

To solve this problem, Japanese Unexamined Patent Publication (KOKAI) No. 62-106826 discloses a method for removing $NO_x$ components from exhaust gas of a diesel engine using a catalyst (or, $NO_x$ absorbent) which can absorb a $NO_x$ component in the exhaust gas in the presence of oxygen.

In the method disclosed by the above Publication, a vessel containing the catalyst (or, $NO_x$ absorbent) is disposed in the exhaust passage of a diesel engine, and the exhaust gas of the engine is introduced into the vessel during operation of the engine. Since the air-fuel ratio of the exhaust gas of the diesel engine is lean (i.e., concentration of oxygen component in the exhaust gas is high), the $NO_x$ absorbent absorbs the $NO_x$ component in the exhaust gas.

When the ability of the $NO_x$ absorbent decreases due to an increase in the amount of the absorbed $NO_x$ in the $NO_x$ absorbed, the exhaust gas flowing into the vessel is cut off, and a reducing agent such as hydrogen gas is introduced into the vessel. By cutting off the exhaust gas flowing into the vessel and introducing the reducing agent, the concentration of oxygen in the vessel becomes lower, and consequently, the absorbed $NO_x$ is released from the $NO_x$ absorbent and is reduced to nitrogen by reacting with the reduction agent. By releasing the absorbed $NO_x$ in the above process, the $NO_x$ absorbent recovers its original capacity for absorbing $NO_x$ in the exhaust gas. (Therefore, the process for causing the release of the absorbed nitrogen from the $NO_x$ absorbent and reduction thereof is called "a regenerating process of the $NO_x$ absorbent" in this specification.)

Since the air-fuel ratio of the exhaust gas of the diesel engine is lean, i.e., oxygen concentration of the exhaust gas is high, if the regeneration process is carried out in the presence of exhaust gas flowing into the vessel, a large amount of the reducing agent is required to consume the oxygen content of the exhaust gas flowing into the vessel to thereby generate an atmosphere of lower oxygen concentration in the vessel. Therefore, in the above method, a regenerating process is carried out by introducing the reducing agent while the exhaust gas flowing into the vessel is cut off.

By cutting off the exhaust gas flowing into the vessel, it is theoretically considered that, in the above method, the amount of the reducing agent required for the regenerating process can be reduced to a sum of the amount required to consume the oxygen content in the exhaust gas remaining in the vessel and the amount required for reducing the $NO_x$ released from the $NO_x$ absorbent.

However, the amount actually required for the regenerating process in the above method becomes much larger than the above theoretical value. This problem is explained with reference to FIGS. 1A and 1B. FIGS. 1A and 1B schematically illustrate the regenerating process disclosed in Japanese Unexamined Patent Publication (KOKAI) No. 62-106826. In FIG. 1A, reference numeral 2 represents an exhaust passage of the diesel engine, and 3 represents a vessel containing a $NO_x$ absorbent 1 connected to the exhaust passage 2. Numeral 5 represents an exhaust shutter valve disposed in the exhaust passage 2 upstream of the vessel 3 to cut off the exhaust gas flowing into the vessel, and 4 represents a nozzle of the reducing agent supply device for supplying a reducing agent to the $NO_x$ absorbent 1 during the regenerating process.

As explained above, the exhaust shutter valve 5 is closed during the regenerating process in this method, and the reducing agent is supplied from the nozzle 4 under the condition in which no exhaust gas flow exists in the vessel 3. Because of the absence of the gas flow carrying the reducing agent, the reducing agent supplied from the nozzle 4 stays in the region near the nozzle 4 and forms a mass of a high concentration reduction agent. This reduction agent progressively diffuses in the vessel, and as time passes, a uniform mixture of the exhaust gas remains in the vessel and the reducing agent is formed. However, in the absence of the gas flow in the vessel, it takes a long time for the reducing agent to diffuse over the entire volume of the vessel. This causes an increase in the time required for the regenerating process to a level not practically acceptable.

Therefore, to reduce the time required for the regenerating process, it is necessary to continue to supply the reducing agent from the nozzle 4 even after the amount of the reducing agent theoretically required for the regeneration of the $NO_x$ absorbent has been supplied from the nozzle 4 so that the mass of the high concentration reducing agent gas replaces the exhaust gas in the vessel instead of diffusing therein. FIG. 1B schematically illustrates the change in the distribution of the concentration of the reducing agent within the vessel. The horizontal axis in FIG. 1B represents the distance from the nozzle 4 in FIG. 1A, and the curves (1) through (4) show the change in the distribution of the reducing agent as time passes. As seen from FIG. 1B curves (1) through (4), the reducing agent continuously supplied from the nozzle expels the exhaust gas from the vessel as time passes (curves (1) through (3)), and finally the vessel is filled with high concentration reducing agent gas.

This means that the amount of the reducing agent required in the above method is much larger than the amount actually required for regeneration of the $NO_x$ absorbent. This causes an increase in the running cost of the device due to higher consumption of the reducing agent, as well as problems such as that surplus reducing agent which is not consumed in the regenerating process being released into the atmosphere at the completion of the regenerating process, or by combining with $NO_x$, forming other pollutants such as ammonia gas.

Also, the time required for the regenerating process becomes relatively long since a large amount of the reducing agent must be supplied from the nozzle to fill the entire volume of the vessel. Especially, if a liquid having a higher boiling point such as kerosene or gas oil is used as the reducing agent, the time required for the regenerating process becomes much longer since the evaporation of such liquid reducing agent takes a substantially longer time. Therefore, in the above method, it is practically difficult to use a liquid reducing agent having a higher boiling point.

Further, the activity of the $NO_x$ absorbent in releasing the absorbed $NO_x$ becomes more vigorous as the temperature of the $NO_x$ absorbent becomes high. Therefore, if the regenerating process is carried out at high temperature, the time required for completing the regenerating process can be reduced. When the reducing agent is supplied to the $NO_x$ absorbent, a part of the supplied $NO_x$ absorbent is oxidized by the $NO_x$ absorbent, and by this oxidation of the reducing agent, the $NO_x$ absorbent is heated. However, in the above method, a temperature rise in the $NO_x$ absorbent by the oxidation of the reducing agent is not sufficient due to the absence of oxygen since the atmosphere of the $NO_x$ absorbent is maintained in the high concentration reducing agent gas during the regenerating process.

SUMMARY OF THE INVENTION

Therefore, in view of the problems of the related art, an object of the present invention is to provide an exhaust gas purification device which can reduce the the consumption of the reducing agent required for the regenerating process of the $NO_x$ absorbent.

Further, another object of the present invention is to provide an exhaust gas purification device which can complete the regenerating process of the $NO_x$ absorbent in a short time.

According to the present invention, there is provided an exhaust gas purification device for an engine having an exhaust passage, the device comprising: at least one $NO_x$ absorbent disposed in the exhaust passage which absorbs the $NO_x$ component in the exhaust gas when an air-fuel ratio of the exhaust gas flowing into the $NO_x$ absorbent is lean, and releases absorbed $NO_x$ in a lower oxygen concentration environment, a reducing agent supply device for supplying a reducing agent to the $NO_x$ absorbent(s) and producing the lower oxygen concentration environment of the $NO_x$ absorbent(s) to regenerate the $NO_x$ absorbent(s), at least one exhaust shutter valve disposed in the exhaust passage for closing the exhaust passage to stop the exhaust gas flow from flowing into the $NO_x$ absorbent(s) during the regeneration of the $NO_x$ absorbent(s), and, a means for generating a carrier gas flow for carrying the supplied reducing agent through the $NO_x$ absorbent(s) during the regeneration of the $NO_x$ absorbent(s).

BRIEF DESCRIPTION OF THE DRAWINGS

The present invention will be more fully understood from the description of preferred embodiments of the invention set forth below, together with the accompanying drawings, in which;

FIGS. 5A through 5C are schematic views of the valve element of the exhaust shutter valve;

FIG. 6 is a schematic view of the bypass passage of the exhaust shutter valve;

DESCRIPTION OF PREFERRED EMBODIMENTS

Figure 1A:
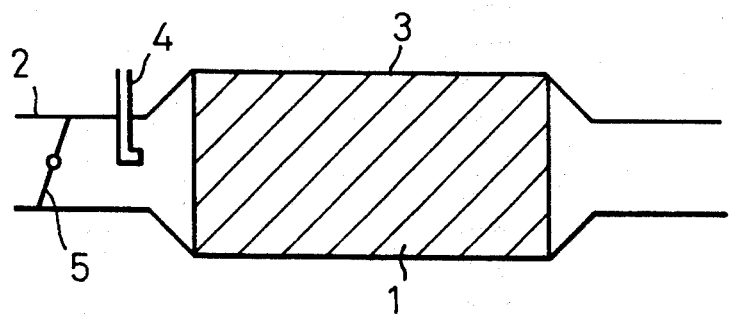
FIGS. 1A and 1B are drawings for explaining the regenerating process of the $NO_x$ absorbent in the prior art.
Figure 1B:
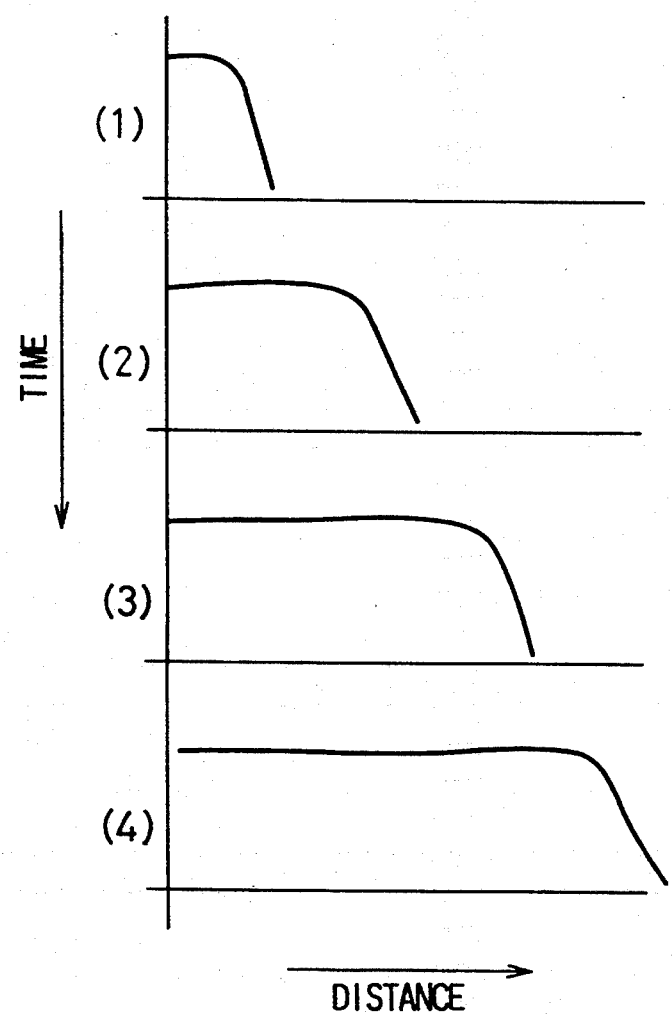
Figure 2A:
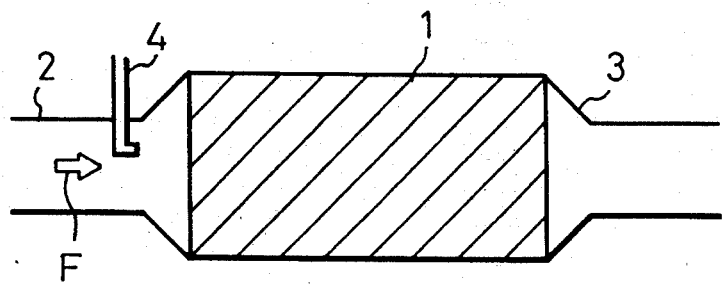
FIGS. 2A and 2B are drawings for explaining the regenerating process of the $NO_x$ absorbent in the present invention.
Figure 2B:
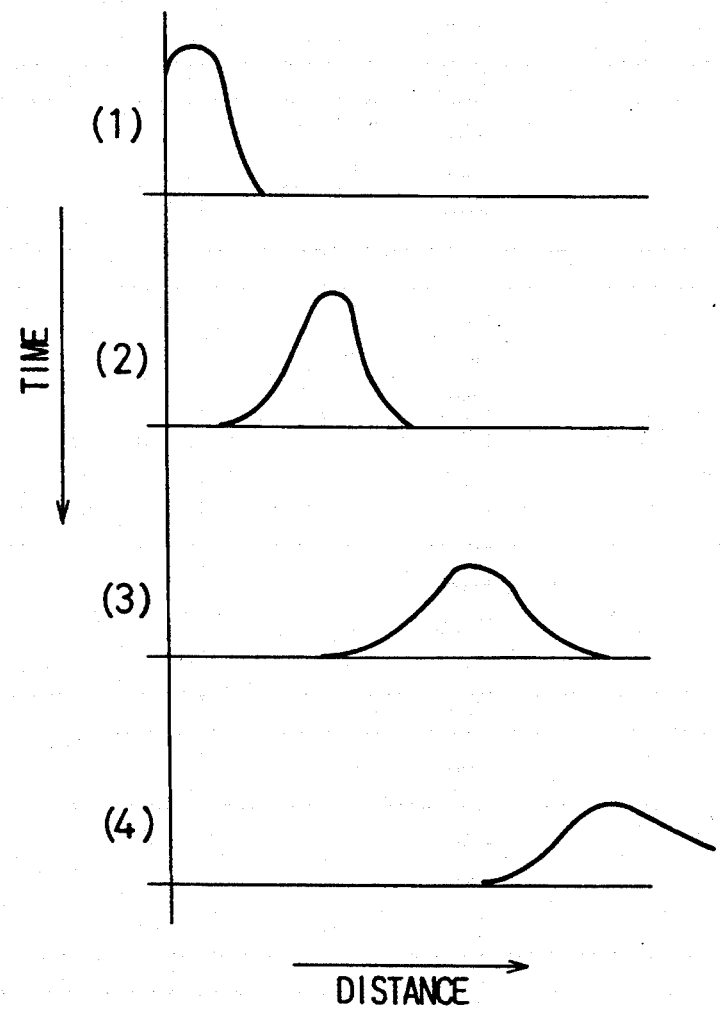

FIGS. 2A and 2B are drawings schematically illustrating the principle of the regenerating process of the $NO_x$ absorbent according to an embodiment of the present invention.

In FIG. 2A, reference numeral 2 represents an exhaust passage of an engine operated on a lean air-fuel ratio, and 3 represents a vessel containing a $NO_x$ absorbent 1 connected to the exhaust passage 2. Numeral 4 represents a nozzle of the reducing agent supply device for supplying a reducing agent to the $NO_x$ absorbent 1 during the regenerating process.

In the regenerating process of the above-mentioned related art, as explained before, the reducing agent is supplied from the nozzle 4 in the absence of gas flow in the vessel 3, and the supplied reducing agent forms a concentrated mass of the reducing agent gas near the nozzle 4. However, in the present invention, the regenerating process of the $NO_x$ absorbent is carried out in the presence of the carrier gas indicated by F in FIG. 2A. Therefore, the mass of reducing agent supplied from the nozzle is carried by the carrier gas and passes through the $NO_x$ absorbent. FIG. 2B curves (1) through (4) show the change in the distribution of the concentration of the reducing agent in the $NO_x$ absorbent in the regenerating process of the present embodiment. As seen from curves (1) through (4), first, the reducing agent supplied from the nozzle 4 forms a concentrated mass of reducing agent gas at the outlet of the nozzle (curve (1)). Then the mass of the reducing agent is carried away from the nozzle 4 by the carrier gas flow F and passes through the $NO_x$ absorbent from one end to the other while diffusing (curves (2) to (4)).

When the mass of the reducing agent passes through the $NO_x$ absorbent, respective parts of the $NO_x$ absorbent come into contact with the mass of high concentration reducing agent gas successively from one end to the other end of the $NO_x$ absorbent, and upon contact with the reducing agent, the respective parts of the $NO_x$ absorbent are regenerated. Namely, in the present embodiment, the $NO_x$ absorbent is regenerated successively from the inlet side of the reducing agent towards the outlet side.

Figure 3:
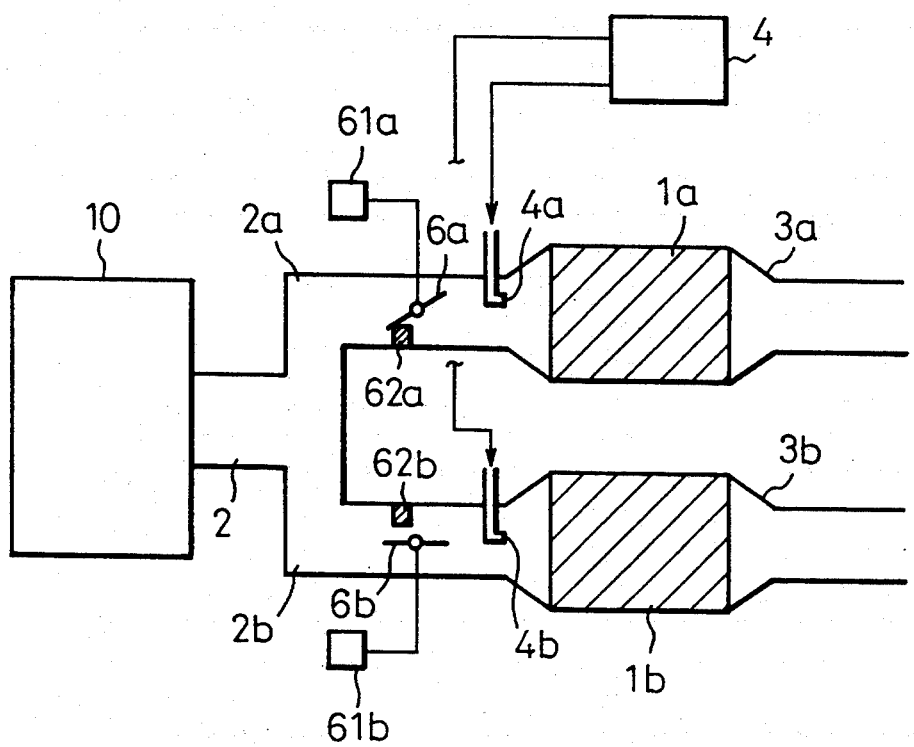
FIG. 3 is a drawing schematically illustrating an embodiment of the present invention.

FIG. 3 schematically illustrates another embodiment of the exhaust gas purification device according to the present invention. In FIG. 3, reference numeral 10 designates an internal combustion engine which is operated on a lean air-fuel ratio, and 2 designates an exhaust passage of the engine 10. In this embodiment, the exhaust passage 2 diverges into two branch exhaust passages 2a and 2b, and exhaust shutter valves 6a and 6b are disposed on the branch exhaust passages 2a and 2b, respectively. Also, vessels 3a and 3b containing $NO_x$ absorbents 1a and 1b are disposed on the branch exhaust passages 2a and 2b downstream of the exhaust shutter valves 6a and 6b. Further, on the branch exhaust passages 2a and 2b between the exhaust shutter valves 6a, 6b and the vessels 3a, 3b, nozzles 4a and 4b of the reducing agent supply device 4 are provided for supplying reducing agent to the $NO_x$ absorbents 1a and 1b.

The $NO_x$ absorbents 1a and 1b contained in the vessels 3a and 3b use, for example, alumina as a carrier, and on this carrier, precious metals such as platinum, and at least one substance selected from alkali metals such as potassium K, sodium Na, lithium Li and cesium Cs; alkali-earth metals such as barium Ba and calcium Ca; and rare-earth metals such as lanthanum La and yttrium Y are carried. The $NO_x$ absorbents 1a and 1b absorb $NO_x$ in the inflowing exhaust gas when the air-fuel ratio of the inflowing exhaust gas is lean, and release the absorbed $NO_x$ when the oxygen concentration of the exhaust gas in the vessels 3a and 3b becomes lower.

In this specification, the term "air-fuel ratio of the exhaust gas" means a ratio of the air and the fuel (or reducing agent and other hydrocarbons) which are supplied to the engine or exhaust passages upstream of the $NO_x$ absorbents. Therefore, when no air and fuel (or reducing agent) is supplied in the exhaust passages upstream of the $NO_x$ absorbents 1a and 1b, the air-fuel ratio of the exhaust gas becomes the same as the operating air-fuel ratio of the engine (i.e., the air-fuel ratio of the air-fuel mixture supplied to combustion chambers of the engine).

In this embodiment, an engine operating on a lean air-fuel ratio, for example, a diesel engine is used as the engine 10, and the air-fuel ratio of the exhaust gas is normally a lean air-fuel ratio. Therefore, the $NO_x$ absorbents 1a and 1b absorb $NO_x$ in the inflowing exhaust gas during normal operation of the engine 10. Also, as explained later in detail, when the reducing agent is supplied from the nozzles 4a and 4b to the $NO_x$ absorbents 1a and 1b, concentrations of oxygen in the vessels 3a and 3b become lower, and this causes the releasing of the absorbed $NO_x$ from the $NO_x$ absorbents 1a and 1b.

Figure 4A:
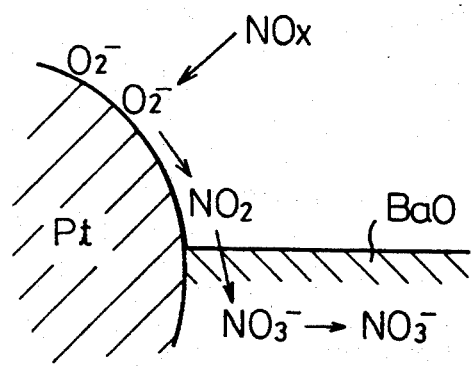
FIGS. 4A and 4B are views for explaining the absorbing and releasing operation of $NO_x$ by the $NO_x$ absorbent.
Figure 4B:
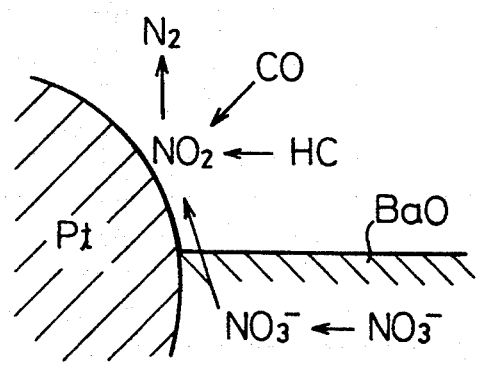

When the $NO_x$ absorbent is disposed in the exhaust passage of the engine, the $NO_x$ absorbent actually performs the above-mentioned absorption and releasing operation of $NO_x$. Though the mechanism of this absorption and releasing operation of the $NO_x$ absorbent is not clear, it is considered that the absorption and releasing operation is conducted by the mechanism as shown in FIGS. 4A and 4B. FIGS. 4A and 4B explain the mechanism of the absorption and the releasing operation in the case where platinum Pt and barium Ba are carried on the carrier, as an example, but it is considered that a similar mechanism is also applied even if other precious metal, alkali metals, alkali earth metals, or rare earth metals are used.

Namely, when the air-fuel ratio of the inflowing exhaust gas is lean, the concentration of oxygen in the exhaust gas becomes quite high. In this case, as shown in FIG. 4A, the oxygen $O_2$ is deposited on the surface of platinum Pt in the form of $O_2^-$ or $O^{2-}$. The NO in the inflowing exhaust gas reacts with $O_2^-$ or $O^{2-}$ on the surface of the platinum Pt and becomes $NO_2$ ($2NO + O_2 \rightarrow 2NO_2$). Then, a part of the produced $NO_2$ is oxidized on the platinum Pt and absorbed into the $NO_x$ absorbent. While bonding with the barium oxide BaO, it is diffused in the absorbent in the form of nitric acid ions $NO_3^-$ as shown in FIG. 4A. In this way, $NO_x$ is absorbed in the $NO_x$ absorbent.

As long as the oxygen concentration in the inflowing exhaust gas is high, the $NO_x$ is produced on the surface of the platinum Pt, and as long as the $NO_x$ is produced on the surface of the platinum Pt, and as long as the $NO_x$ absorption capacity of the absorbent is not saturated, the $NO_x$ is absorbed into the $NO_x$ absorbent and nitric acid ions $NO_3^-$ are produced.

On the other hand, when the oxygen concentration in the inflowing exhaust gas is lowered, the production of $NO_2$ is lowered and the reaction proceeds in an inverse direction ($NO_3^- \rightarrow NO_2$), and thus nitric acid ions $NO_3^-$ in the absorbent are released in the form of $NO_2$ from the $NO_x$ absorbent. Namely, in FIG. 3, when the reducing agent is supplied to the $NO_x$ absorbent from the nozzles 4a and 4b, the oxygen concentration in the inflowing exhaust gas is lowered, and the $NO_x$ is released from the $NO_x$ absorbent 1a and 1b.

In this case, the components such as HC, CO, in the reducing agent supplied to the $NO_x$ absorbent react with the oxygen $O_2$ in the exhaust gas and oxygen $O_2^-$ or $O^{2-}$ on the platinum Pt and are oxidized. By this oxidation of the reducing agent, the oxygen component existing near the $NO_x$ absorbent is consumed, and the concentration of oxygen in the atmosphere around the $NO_x$ absorbent is lowered. Also, the $NO_2$ released from the $NO_x$ absorbent reacts with the HC and CO in the reducing agent as shown in FIG. 4B and reduced to $N_2$. In this way, when the $NO_2$ on the surface of the platinum Pt reacts with HC and CO in the reducing agent, and when the $NO_2$ no longer exist on the surface of the platinum Pt, the $NO_2$ is successively released from the absorbent. Accordingly, when the reducing agent is supplied to the $NO_x$ absorbent, the $NO_x$ is released from $NO_x$ absorbent in a short time.

Namely, the HC and CO components in the reducing agent supplied to $NO_x$ absorbent immediately react with the $O_2^-$ or $O^{2-}$ on the platinum Pt and are oxidized, and subsequently if the HC and CO still remain after the $O_2^-$ or $O^{2-}$ on the platinum Pt are consumed, the $NO_x$ released from the absorbent is reduced and is thus prevented from being discharged into the outside air.

In FIG. 3, the reducing agent supply unit 4 includes nozzles 4a and 4b to inject a predetermined amount of the reducing agent into the branch exhaust passages 2a and 2b upstream of the $NO_x$ absorbents 1a and 1b. The reducing agent used in the present invention is a substance which can produce components such as HC and CO in the exhaust gas to reduce the $NO_x$ released from the $NO_x$ absorbent 1a and 1b to $N_2$. Therefore, reducing gases such as hydrogen gas or carbon monoxide gas, gaseous or liquid hydrocarbons such as propane, propylene or butane, and liquid fuels such as gasoline, gas oil or kerosene, etc., can be used as the reducing agent in the present invention. In this embodiment, since a diesel engine is employed as the engine 10, the same gas oil as the fuel of the engine 10 is used as the reducing agent, and the pressurized gas oil is supplied from the fuel pump of the engine 10 (not shown in FIG. 3) to the reducing agent supply device 4. Though not shown in the drawing, the reducing agent supply device 4 also includes control valves which control the amount of the gas oil injected from the supply nozzles 4a and 4b.

The exhaust shutter valves 6a and 6b are, for example, butterfly valves which are operated by the actuators of appropriate type 61a and 61b, respectively. In this embodiment, exhaust shutter valves 6a and 6b are provided with stoppers 62a and 62b, respectively, to prevent the exhaust shutter valves from fully closing. Namely, when closing, the exhaust shutter valves 6a and 6b are kept at a predetermined degree of opening by the stoppers 62a and 62b, to thereby generate a small amount of exhaust gas flow which carries the reducing agent supplied from the nozzles 4a and 4b through the $NO_x$ absorbents 1a and 1b.

Next, the operation of the exhaust gas purification device in FIG. 3 will be explained.

In this embodiment, the regeneration of the $NO_x$ absorbents 1a and 1b is carried out alternately. Namely, in the normal operation, one of the exhaust shutter valves 6a and 6b (for example, 6a) is fully opened and the exhaust gas from the engine 10 passes through the $NO_x$ absorbent 1a, and the $NO_x$ in the exhaust gas is absorbed in the $NO_x$ absorbent 1a. After absorbing the $NO_x$ in the exhaust gas for a predetermined time, the exhaust shutter valve 6a is closed and the exhaust shutter valve 6b is fully opened so that the exhaust gas from the engine 10 passes through the $NO_x$ absorbent 1b, thus the $NO_x$ in the exhaust gas is absorbed in the $NO_x$ absorbent 1b. At the same time, a predetermined amount of the reducing agent is injected into the branch exhaust passage 2a upstream of the $NO_x$ absorbent 1a from the nozzle 4a of the reducing agent supply device 4 to regenerate the $NO_x$ absorbent 1a.

As explained before, the reducing agent supplied from the nozzle 4a forms a mass of high concentration reducing agent near the nozzle 4a. However, in this embodiment, the exhaust shutter valve 6a is provided with the stopper 62a, and a small amount of the exhaust gas passes through the exhaust shutter valve 6a even when the exhaust shutter valve 6a is closed. Therefore, there exists a carrier gas flow passing through the $NO_x$ absorbent 1a when the reducing agent is supplied from the nozzle 4a. The mass formed by the reducing agent supplied from the nozzle 4a is carried away by the above carrier gas flow and passes through the $NO_x$ absorbent 1a. Consequently, the mass of the reducing agent passing through the $NO_x$ absorbent 1a comes into contact with the respective portions of the $NO_x$ absorbent 1a from the upstream side to the downstream side thereof successively. When contact is made with the mass of the reducing agent, the absorbed $NO_x$ is released from the respective portions of the $NO_x$ absorbent 1a and reduced by the reducing agent. Namely, the respective portion of the $NO_x$ absorbent 1a is successively regenerated from the upstream side to the downstream side thereof.

When the mass of the reducing agent passes all the portions of the $NO_x$ absorbent 1a, i.e., when the entire of the $NO_x$ absorbent 1a is regenerated, the exhaust shutter valve 6a is maintained at a closed position. Then, when the predetermined time has lapsed, the exhaust shutter valve 1a is fully opened to re-start the absorption of the $NO_x$ in the exhaust gas by $NO_x$ absorbent 1a, and the exhaust shutter valve 6b is closed to start the regenerating process of the $NO_x$ absorbent 1b in the same manner.

As explained above, the mass of reducing agent carried by the carrier gas flow moves through the $NO_x$ absorbent and contacts respective portions of the $NO_x$ absorbent successively in this embodiment. Since it is not necessary to fill the entire volume of the vessels with reducing agent, the amount of the reducing agent supplied to the $NO_x$ absorbent is reduced to the sum of the amount required for consuming the oxygen component in the carrier gas and the amount required for regenerating the $NO_x$ absorbent (i.e., the amount required for consuming the oxygen on the platinum Pt and reducing the $NO_x$ released from the absorbent).

Also in this embodiment, the closing angles of the exhaust shutter valve 6a and 6b can be set arbitrarily by changing the position of the stoppers 62a and 62b. Therefore, the velocity of the mass of the reducing agent moving through the $NO_x$ absorbents (i.e., the space velocity of the reducing agent) can be set suitably according to the characteristics of the $NO_x$ absorbent used in such a manner that the regeneration of the $NO_x$ absorbent can be completed in a short time.

The amount of the carrier gas flow (i.e., the amount of the exhaust gas flowing into the vessel when the exhaust shutter valve is closed) is determined in accordance with the types and sizes of the $NO_x$ absorbent used. However in general, the amount of the carrier gas flow is set at several percent of the amount of the exhaust gas flow in the normal operation of the engine. Consequently, the amount of the reducing agent required for consuming the oxygen component in the carrier gas is very small, and the amount of the reducing agent required for the regenerating process is not substantially increased by the presence of the carrier gas flow.

Further, by the presence of the carrier gas flow, since the temperature of the $NO_x$ absorbent rises quickly, the time required for the regeneration of the $NO_x$ absorbent is shortened. Namely, when the mass of the reducing agent passes through the $NO_x$ absorbent, a mixture of the reducing agent and the carrier gas (exhaust gas, in this embodiment) is formed at the boundary of the mass of the reducing agent, and this mixture also passes through the $NO_x$ absorbent as the mass of the reducing agent moves through the $NO_x$ absorbent. Since the concentration of the oxygen is relatively high in this mixture, the reducing agent component in the mixture reacts with the oxygen in the exhaust gas actively by the catalytic action of the platinum Pt in the $NO_x$ absorbent. Therefore, the respective portions of the $NO_x$ absorbent are heated by the oxidation of the reducing agent and the temperature of the respective portions of the $NO_x$ absorbent rises quickly as the mixture passes. Thus, a uniform temperature rise of the $NO_x$ absorbent is obtained as the mixture passes through the $NO_x$ absorbent. By this temperature rise, the releasing of the $NO_x$ from the respective portions of the $NO_x$ absorbent becomes active. Consequently, the absorbed $NO_x$ is released from the absorbent in a short time and reduced by the mass of the high concentration reducing agent which passes through the $NO_x$ absorbent. In this way, the releasing and reducing of the $NO_x$ absorbed in the $NO_x$ absorbent (i.e., the regenerating process) is completed effectively in a short time.

The generation of carrier gas flow is especially effective when a liquid reducing agent having a higher boiling point, such as gas oil, is used a higher boiling point such as gas oil is used. As explained before, the reducing agent (gas oil) injected from the nozzle forms a mass of the mist of the gas oil around the nozzle. In the absence of the carrier gas flow, it takes quite a long time for the mist of the gas oil to evaporate and fill the entire volume of the vessel containing the $NO_x$ absorbent. However, when the carrier gas flow exists, the mass of the mist is carried by the carrier gas flow and contacts the $NO_x$ absorbent, and at the boundary of the mass, the mist of the gas oil is oxidized (burned) by the catalytic action of the $NO_x$ absorbent as explained above. By this oxidation of the gas oil, not only is the temperature rise of the $NO_x$ absorbent obtained, but also a large amount of unburnt HC and CO component, which is effective to reduce the $NO_x$ released from the $NO_x$ absorbent, is generated. Further, the mist of the gas oil contacting the heated portions of the $NO_x$ absorbent evaporates quickly to form gaseous HC. Therefore, by generating the carrier gas flow, the regenerating process of the $NO_x$ absorbent can be completed in a short time even when a liquid reducing agent having a higher boiling point is used.

Though the carrier gas flow is generated by the stoppers 62a, 62b which allow a small amount of exhaust gas to pass through the exhaust shutter valves 6a, 6b, other means can also be employed to generate the carrier gas flow. FIGS. 5A through 5C show examples of other means for allowing the exhaust gas of the engine to pass through the exhaust shutter valve even when the exhaust shutter valve is fully closed.

In FIGS. 5A through 5C, reference numeral 63 shows the disk-like valve element of the exhaust shut valve. In FIG. 5A, the shape of the valve element 63 is determined so that a predetermined clearance (shown by "L" in FIG. 5A) is formed between the edge of the valve element 63 and the inner wall 21 of the exhaust passage. Therefore, even when the exhaust shutter valve is fully closed, a small amount of the exhaust gas is allowed to pass through the exhaust shutter valve.

Similarly, FIGS. 5B and 5C show examples in which notch(es) 63a (FIG. 5B) and aperture(s) 63B (FIG. 5C), respectively, of a predetermined area are formed on the valve element 63 of the exhaust shutter valve to allow the exhaust gas to pass therethrough.

Further, FIG. 6 shows another example of the means for generating the carrier exhaust gas flow when the exhaust shutter valve is fully closed. In FIG. 6, a bypass passage 64 connecting the portions of the exhaust passage 21 upstream and downstream of the exhaust shutter valve 6 is provided to allow the exhaust gas of the engine to flow therethrough when the exhaust shutter valve 6 is fully closed. In this case, a stopper or notch, clearance, etc., is not provided on the valve element of the exhaust shutter valve.

Figure 7:
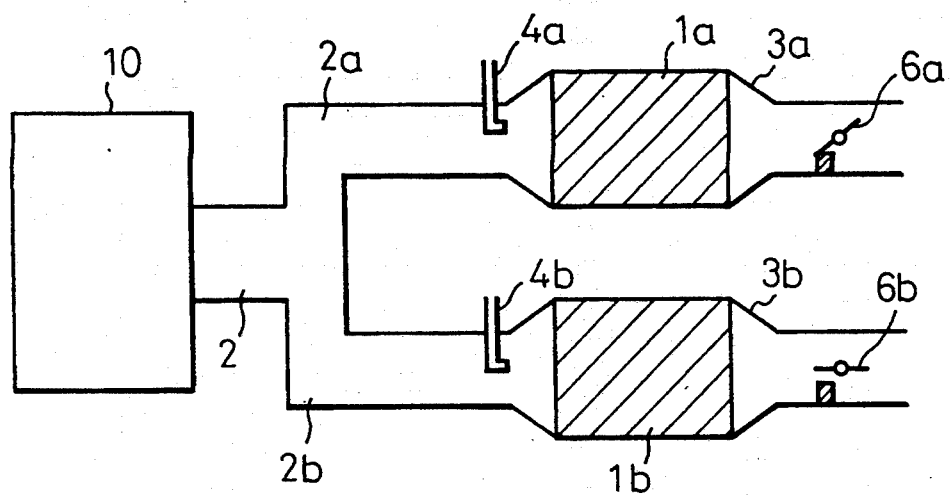
FIGS. 7 through 11 are drawings illustrating other embodiments of the present invention.
Figure 8:
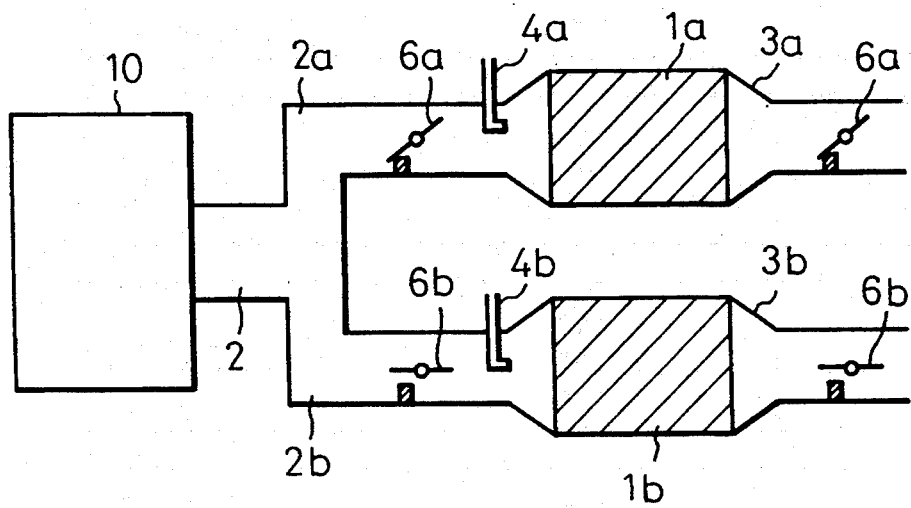

Although, the exhaust shutter valves 6a and 6b are disposed in the exhaust passages upstream of the vessels 3a and 3b containing the $NO_x$ absorbents 1a and 1b in FIG. 3, the exhaust shutter valves 6a and 6b are not necessarily disposed in the exhaust passages upstream of the vessels 3a and 3b so long as a predetermined amount of the exhaust gas flow can be established through the $NO_x$ absorbents 1a and 1b. For example, as shown in FIG. 7, the exhaust shutter valves 6a and 6b can be disposed in the exhaust passages downstream of the vessels 3a and 3b. Also, the exhaust shutter valves 6a and 6b can be disposed in the exhaust passages both upstream and downstream of the vessels 3a and 3b as shown in FIG. 8. By disposing the exhaust shutter valves both upstream and downstream of each vessel, the velocity of the carrier gas flow can be controlled more precisely.

Figure 9:
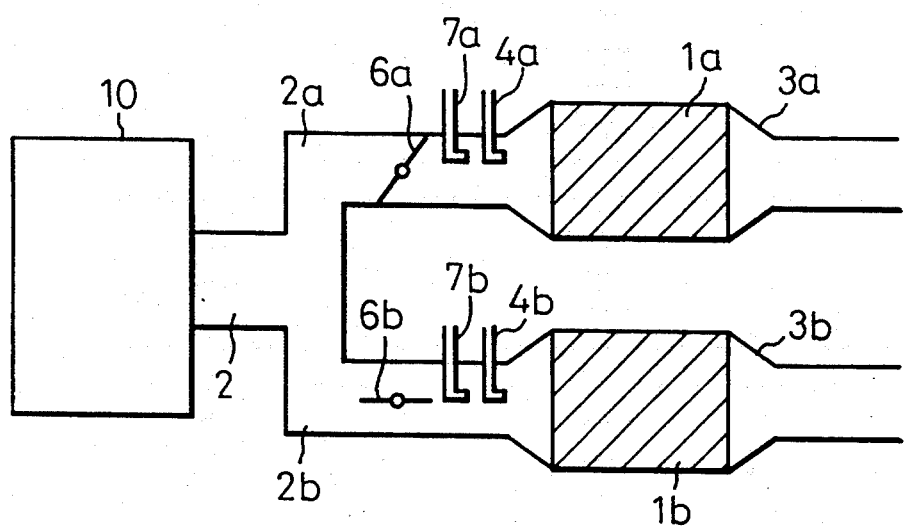

In the above embodiments, exhaust gas from the engine is used to generate the carrier gas flow. However, other gas such as air instead of the exhaust gas also can be used to generate the carrier gas flow. FIG. 9 shows an embodiment in which air flow is used as the carrier gas flow.

In FIG. 9, the same reference numerals as those in FIG. 3 indicate the same elements. In FIG. 9, air nozzles 7a and 7b are disposed in the exhaust passages 2a and 2b, respectively, between the exhaust shutter valves 6a, 6b and the nozzles 4a, 4b of the reducing agent supply device 4. In this case, the means for allowing the exhaust gas to pass through the exhaust shutter valves 6a and 6b shown in FIGS. 5A through 5C and FIG. 6 is not provided. The air nozzles 7a and 7b are connected to a pressurized air supply source such as an air pump via respective metering orifices and shut off valves (not shown in the drawing). When the regenerating process of one of the $NO_x$ absorbent is carried out, the exhaust shutter valve 6a or 6b located upstream of the $NO_x$ absorbent which is regenerated, is closed, and the shut off valve of the air nozzle located downstream of that exhaust shutter valve is opened to introduce a predetermined amount of the air flow into the exhaust passage between the exhaust shutter valve and the reducing agent nozzle to generate the carrier gas flow (in this case, the carrier air flow). In this arrangement, the velocity of the carrier gas (air) flow can be maintained constant regardless of the operating condition of the engine. Therefore, the space velocity of the reducing agent supplied to the $NO_x$ absorbent can be maintained suitably regardless of the operating condition of the engine.

Figure 10:
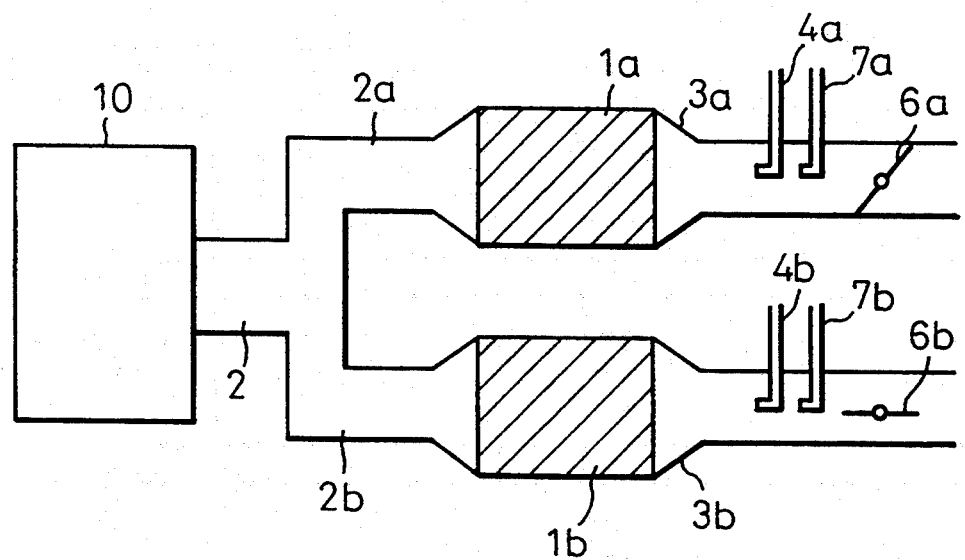

In the embodiment in FIG. 9, though the carrier air flow and the reducing agent are supplied to the $NO_x$ absorbents from the upstream side exhaust passages, the air flow and the reducing agent may be supplied to the $NO_x$ absorbents from the downstream side of the exhaust passages, as shown in FIG. 10. In this case, the reducing agent supply nozzles 4a, 4b, air nozzles 7a, 7b and the exhaust shutter valves 6a, 6b are disposed in the exhaust passages 2a, 2b downstream of the vessels 3a, 3b in this order, and the air and reducing agent flow through the $NO_x$ absorbents 3a and 3b in the opposite direction to the exhaust gas flow and flow through another $NO_x$ absorbent after mixing with the exhaust gas upstream of the $NO_x$ absorbent.

In the embodiments explained above, the carrier gas is supplied to the $NO_x$ absorbent continuously so that a continuous carrier gas flow is generated during the regenerating process. However, it is possible to supply the carrier gas intermittently to the $NO_x$ absorbent so that intermittent flow of the carrier gas is generated during the regenerating process of the $NO_x$ absorbent. Also, the reducing agent can be supplied to the $NO_x$ absorbent intermittently. If either the reducing agent or the carrier gas, or both are supplied to the $NO_x$ absorbent intermittently, it is possible to set the timing of the supply of the carrier gas and reducing agent so that the masses of the reducing agent and the carrier gas pass through the $NO_x$ absorbent alternatively. For example, as explained later in detail, if the reducing agent is supplied from the reducing agent supply nozzle at intervals and the carrier gas is supplied continuously, the mass of the high concentration reducing agent is formed in the carrier gas flow at intervals. Consequently, the mass of reducing agent and the mass of the carrier gas which does not contain the reducing agent flow into the $NO_x$ absorbent alternatively. Therefore, the respective portions of the $NO_x$ absorbent are heated as the mass of the reducing agent passes, due to the heat generated by the oxidation of the reducing agent at the boundary of the mass of the reducing agent.

Figure 11:
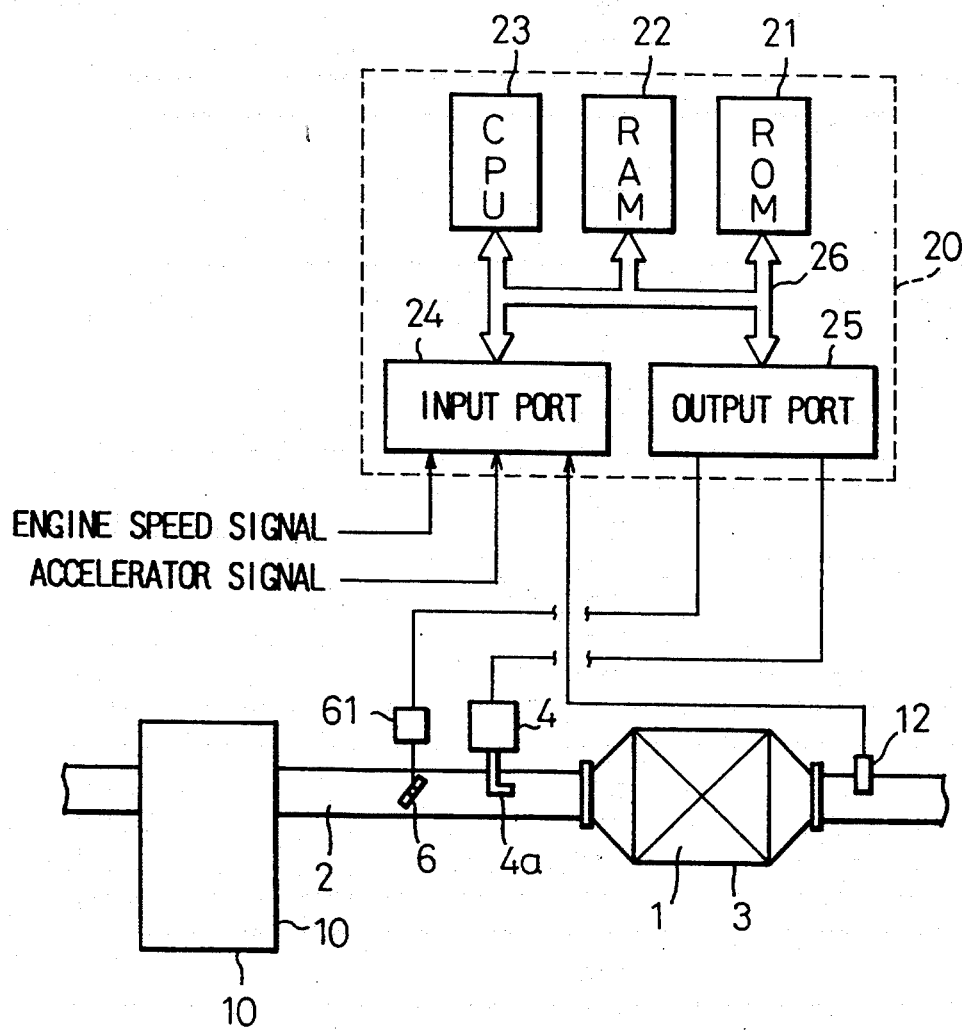

Next, an embodiment of the exhaust gas purification device in which either the reducing agent or the carrier gas, or both are supplied intermittently during the regenerating process of the $NO_x$ absorbent is explained by referring to FIG. 11.

FIG. 11 shows the embodiment of the exhaust gas purification device in which the exhaust gas is used as the carrier gas. Further, FIG. 11 shows the case in which only one vessel containing $NO_x$ absorbent is provided in a straight exhaust passage (the term "straight exhaust passage" in this specification means single exhaust passage having no branch exhaust passages). However, the principle of the operation of the exhaust gas purification device in FIG. 11 can be also applied to the cases in which a plurality of the vessels are disposed in branch exhaust passages (such as shown in FIG. 3), or the cases in which air is used as the carrier gas.

In FIG. 11, reference numeral 10 represents an engine operating on a lean air-fuel ratio such as a diesel engine, and 2 represents an exhaust passage of the engine 10. As shown in FIG. 11, the exhaust passage 2 is a straight exhaust passage having no branches, and a vessel 3 containing the $NO_x$ absorbent 1 explained before is connected to this exhaust passage 2. In the exhaust passage upstream of the vessel 3, an exhaust shutter valve 6 is disposed. The exhaust shutter valve 6 is a type such as a butterfly valve which, when fully open, has low flow resistance. The exhaust shutter valve 6 is maintained at a fully opened position during a normal operation of the engine, and is closed to a predetermined angle to reduce the exhaust gas flowing into the vessel 3 when the regenerating process of the $NO_x$ absorbent 1 is carried out. Numeral 61 represents an actuator of appropriate type such as a solenoid actuator or diaphragm type vacuum actuator which drives the exhaust shutter valve 6 according to the control signal from the control circuit 20 explained later, to make the exhaust shutter valve 6 take the fully opened position or the closed position.

In this embodiment, a reducing agent supply nozzle 4a for supplying the reducing agent to the $NO_x$ absorbent 1 is provided in the exhaust passage 3 between the exhaust shutter valve 6 and the vessel 3. The reducing agent supply nozzle 4a may be disposed in the exhaust passage 3 upstream of the exhaust shutter valve 6. Since a diesel engine is used as the engine 10 in this embodiment, a gas oil is also used as the reducing agent, and the reducing agent (gas oil) is supplied from the fuel oil pump (not shown) of the engine 10 to the reducing agent supply nozzle via a reducing agent supply control valve 4. The control valve 4 opens when it receives a control signal from the control circuit 20 to inject the gas oil from the reducing agent supply nozzle 4a into the exhaust passage 3 upstream of the vessel 3.

Numeral 12 in FIG. 11 shows an exhaust gas temperature sensor disposed in the exhaust passage 2 downstream of the vessel 3. The exhaust gas temperature sensor 12 generates a voltage signal corresponding to the exhaust gas temperature.

The electronic control circuit 20 comprises a digital computer and is provided with a ROM (read only memory) 21, a RAM (random access memory) 22, a CPU (microprocessor) 23, an input port 24 and an output port 25, which are interconnected by a bidirectional bus 26. The control circuit 20 performs a basic control of the engine 10 such as a fuel injection control. In addition, the control circuit 20 controls the regenerating process of the $NO_x$ absorbent 1 in this embodiment by controlling the opening/closing actions of the exhaust shutter valve 6 and the reducing agent supply control valve 4. For this purpose, a signal representing the exhaust gas temperature is fed to the input port 24 from a exhaust gas temperature sensor 12 via an analog to digital converter (not shown in the drawing). Also, other signals such as an accelerator signal which represents a stroke of an accelerator pedal and an engine speed signal are fed to the input port 24 of the control circuit 20. On the other hand, the output port 25 of the control circuit 20 is connected to the actuator 61 of the exhaust shutter valve 6 and the reducing agent supply control valve 4 and feeds signals to control the action of these valves.

Since a straight exhaust passage is employed in this embodiment, the regeneration of the $NO_x$ absorbent 1 must be performed while allowing the exhaust gas of the engine to pass through the $NO_x$ absorbent 1 during the operation of the engine 10. Therefore, if the oxygen content in the entire inflowing exhaust gas must be lowered, a large amount of the reducing agent is required. In this embodiment, the reducing agent and the exhaust gas are introduced into the $NO_x$ absorbent 1 in such manner that the mass of the reducing agent and the mass of the exhaust gas (more precisely, a mass of the mixture of the reducing agent and the exhaust gas in which the concentration of the reducing agent is very high and a mass of the mixture of the reducing agent and the exhaust gas in which the concentration of the reducing agent is low) pass through the $NO_x$ absorbent 1 alternately during the regenerating process of the $NO_x$ absorbent 1.

Namely, in this embodiment, the respective masses of the reducing agent move through the $NO_x$ absorbent 1 during the regenerating process, in such a manner that the masses of the reducing agent are placed between the masses of the exhaust gas. As explained before, when the respective masses of the reducing agent pass through the $NO_x$ absorbent 1, the $NO_x$ absorbent 1 is heated by the oxidation of the reducing agent at the boundary of the masses, then the mass of the high concentration reducing agent contacts the heated portion of the $NO_x$ absorbent. Therefore, the absorbed $NO_x$ is released rapidly from the heated $NO_x$ absorbent and reduced by contacting the mass of the high concentration reducing agent and consequently, the regeneration of the $NO_x$ absorbent can be completed in a short time.

The amount of the reducing agent required for generating such masses of the reducing agent is very small compared to the amount required for lowering the oxygen content of the entire exhaust gas. Therefore, the regenerating process of the $NO_x$ absorbent can be performed in a short time with lower consumption of the reducing agent in this embodiment.

Next, the method for generating the masses of the reducing agent and the masses of the exhaust gas which pass through the $NO_x$ absorbent alternately will be explained. In this embodiment, the masses of the reducing agent and the masses of the exhaust gas are generated by the opening and closing action of the exhaust shutter valve 6 and the timing of the injection of the reducing agent from the supply nozzle 4a. Therefore, the following three combinations of the action of the exhaust shutter valve 6 and the timing of the injection of the reducing agent are possible.

①  The exhaust shutter valve 6 is opened and closed at predetermined intervals, and the reducing agent is injected continuously from the supply nozzle 4a.

②  The exhaust shutter valve 6 is opened and closed at predetermined intervals, and the reducing agent is injected from the supply nozzle 4a in accordance with the opening and closing action of the exhaust shutter valve 6.

③  The exhaust shutter valve 6 is maintained at a predetermined opened position, and the reducing agent is injected from the supply nozzle 4a at predetermined intervals.

Figure 12:
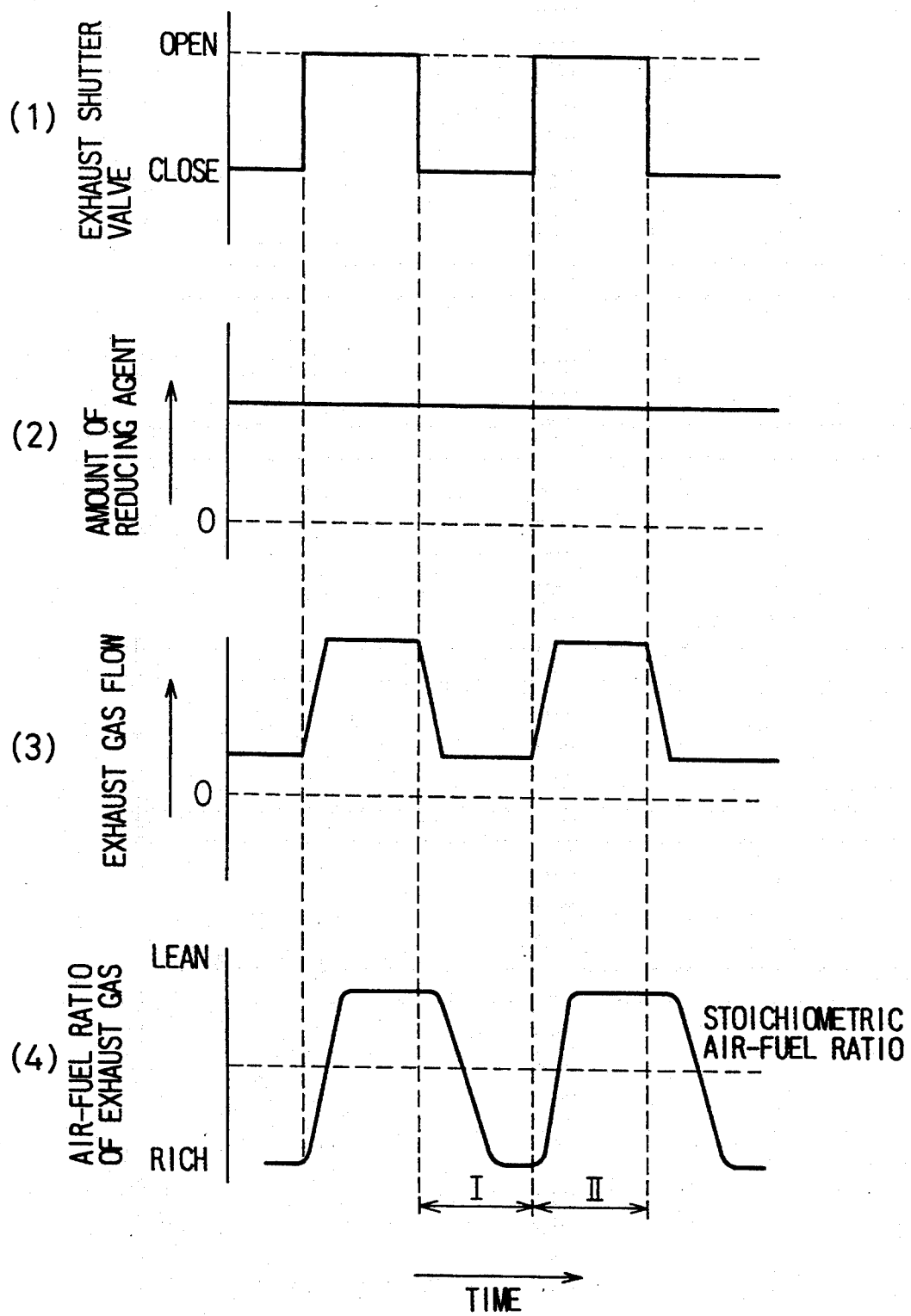
FIGS. 12 through 14 are timing diagrams explaining the operation of the exhaust shutter valves and the reducing agent supply control valve; and, FIG. 15 is a flowchart showing the regenerating process of the $NO_x$ absorbent in the embodiment in FIG. 11.
Figure 13:
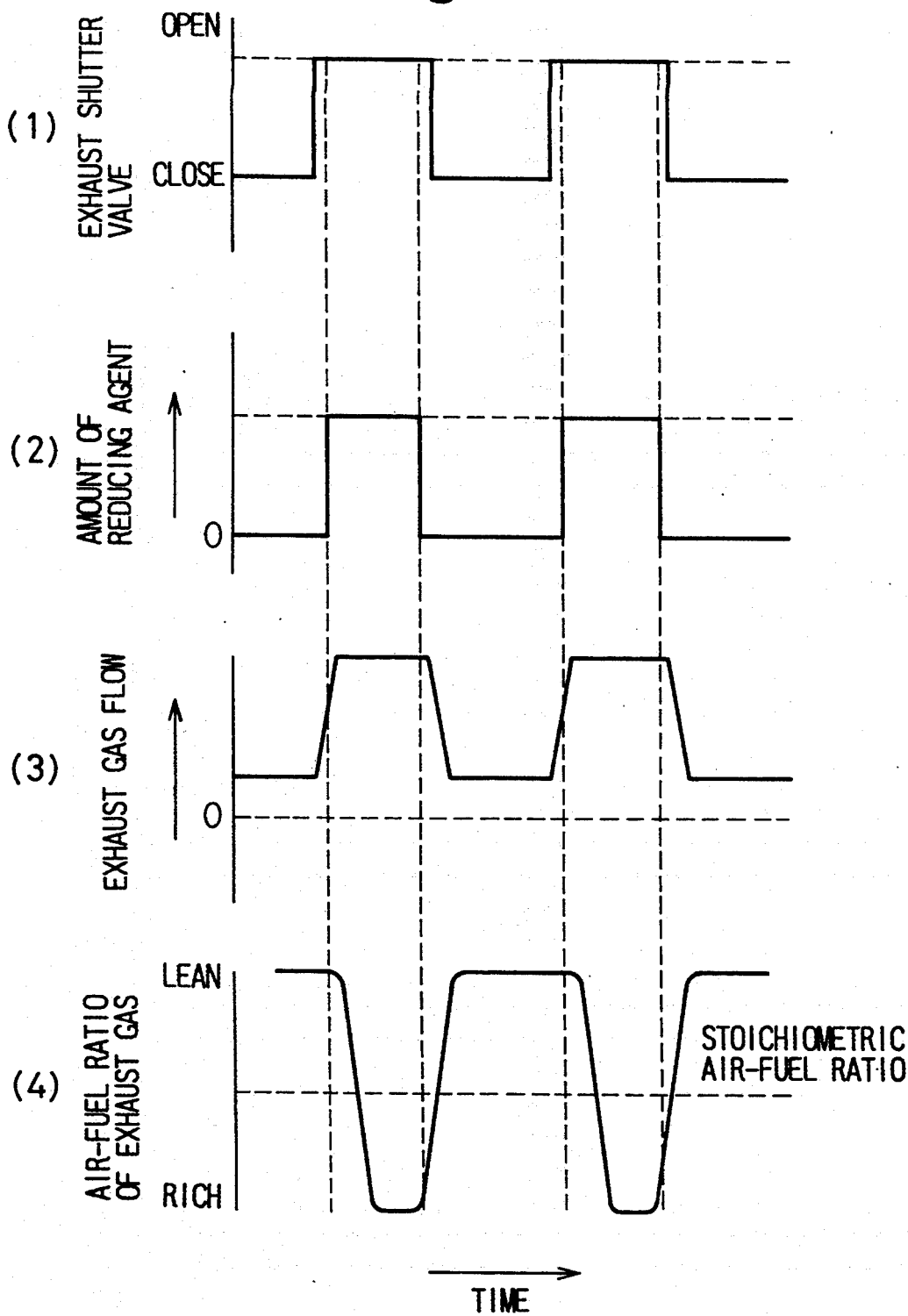
Figure 14:
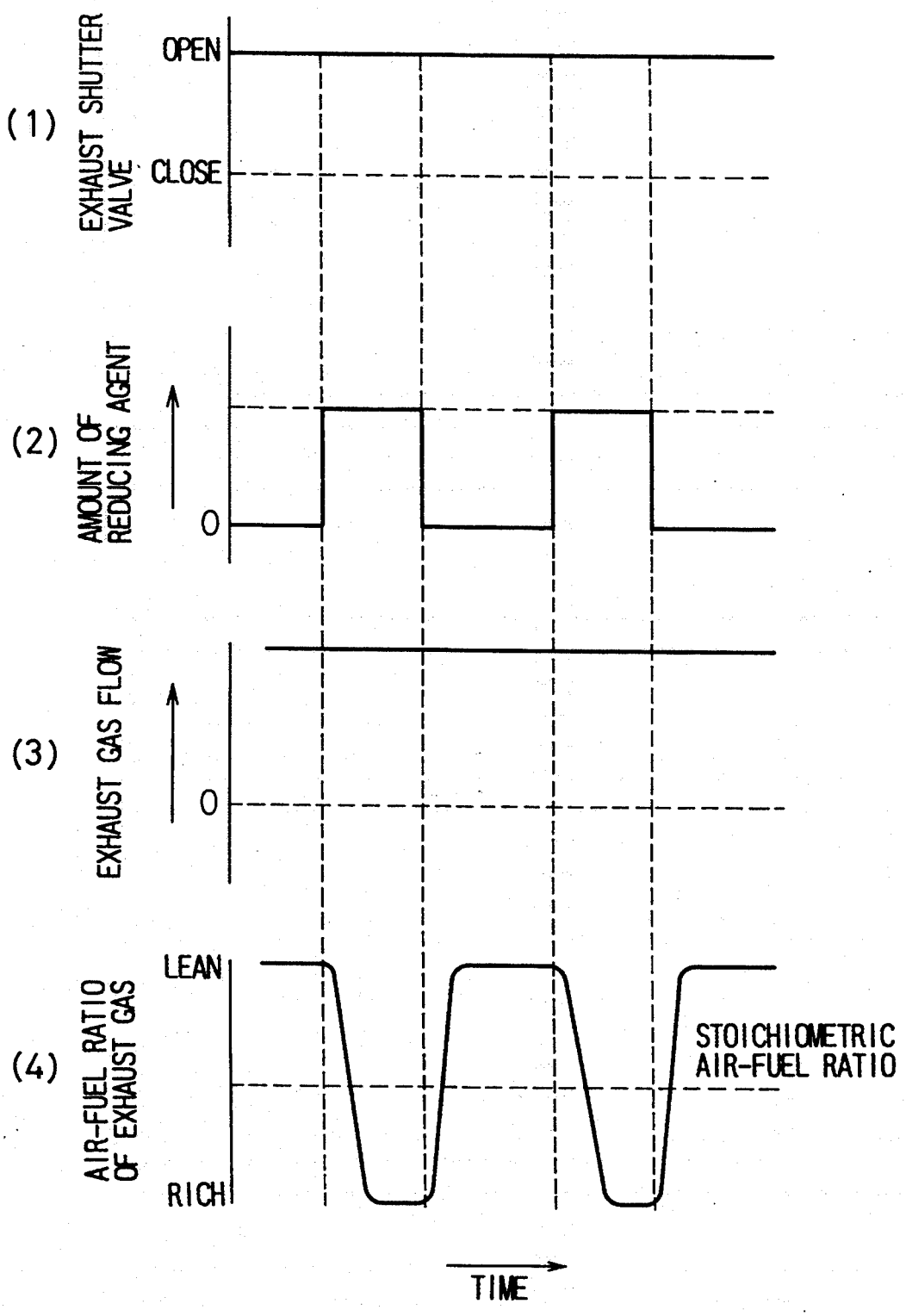

FIGS. 12 through 14 are timing diagrams showing the relationships of the opening and closing actions of the exhaust shutter valve 6 (curve (1) in the respective drawings), the timing of the injection of the reducing agent from the supply nozzle (curve (2)), and the change in the flow and the air-fuel ratio of the exhaust gas flowing into the vessel 3 (curve (3) and curve (4), respectively) in the above three cases.

FIG. 12 shows the above case ①. As seen from curve (1) in FIG. 12, the exhaust shutter valve 6 is opened and closed at predetermined intervals, and the amount of the inflowing exhaust gas into the vessel 3 is increased and decreased (curve (3)) in accordance with the opening and closing action of the exhaust shutter valve 6. On the other hand, the reducing agent is injected from the supply nozzle 4a continuously (curve (2)). Therefore, when the exhaust shutter valve 6 is closed (the period designated by I in the drawing), since the velocity of the inflowing exhaust gas becomes low, the reducing agent injected from the supply nozzle 4a forms a mass of reducing agent (i.e., mass of the mixture of the reducing agent and exhaust gas, in which the concentration of the reducing agent is very high) near the supply nozzle 4a, and the air-fuel ratio of the exhaust gas near the supply nozzle 4a becomes rich (curve (4)). On the contrary, when the exhaust shutter valve 6 is opened to a predetermined position (the period II in FIG. 12), since the velocity of the inflowing exhaust gas increases, the mass of the reducing agent is carried away by the inflowing exhaust gas, and the air-fuel ratio of the exhaust gas near the supply nozzle 4a is lowered, i.e., the mass of the exhaust gas which contains a relatively low concentration of the reducing agent is formed. Therefore, by repeating the opening and closing action of the exhaust shutter valve 6, the mass of the reducing agent and the mass of the exhaust gas are generated alternately, and pass through the $NO_x$ absorbent 1.

In the case of FIG. 12, the masses of the exhaust gas formed when the exhaust shutter valve 6 is opened also contain the reducing agent. However, the concentration of the reducing agent in these masses of the exhaust gas is relatively low and the air-fuel ratio of these masses of the exhaust gas is considerably lean compared to the stoichiometric air-fuel ratio. Therefore, the overall air-fuel ratio of the inflowing exhaust gas is maintained at a lean air-fuel ratio and the total amount of the reducing agent supplied to the $NO_x$ absorbent is largely reduced compared to the amount required for maintaining the air-fuel ratio of the entire inflowing exhaust gas at a rich air-fuel ratio. Further, since the masses of the exhaust gas also contain the reducing agent of relatively low concentration in this case, the oxidation of the reducing agent on the $NO_x$ absorbent also occurs when the masses of the exhaust gas passe through the $NO_x$ absorbent 1. Therefore, temperature of the $NO_x$ absorbent rises faster in this case.

FIG. 13 shows the above case ②. In this case, the reducing agent is injected from the supply nozzle 4a only when the exhaust shutter valve 6 is opened (curves (1) and (2)). Therefore, unlike the above case ①, the mass of the exhaust gas formed while the exhaust shutter valve 6 opens does not contain the reducing agent. Consequently, the amount of the reducing agent supplied during the regenerating process of the $NO_x$ absorbent can be reduced compared to the amount required in the case ①.

FIG. 14 shows the above case ③. In this case, the exhaust shutter valve 6 is maintained at a predetermined opening position (curve (1)), and the amount of the inflowing exhaust gas becomes constant (curve (3)). On the other hand, the reducing agent is injected from the supply nozzle 4a at predetermined intervals (curve (2)). Therefore, the masses of the reducing agent and the masses of the exhaust gas which do not contain the reducing agent are formed alternately in the similar manner as the case ②. In this case, instead of injecting the reducing agent at predetermined intervals, if the amount of the reducing agent injected from the supply nozzle 4a is increased or decreased at predetermined intervals, the mass of the exhaust gas including relatively small amount of the reducing agent can be formed in a similar manner as in the case ①.

The methods ① through ③ can be used independently during the regenerating process of the $NO_x$ absorbent, but also one or more of these methods can be used during the regenerating process in accordance with the condition of the $NO_x$ absorbent (for example, in accordance with the temperature of the $NO_x$ absorbent).

Figure 15:
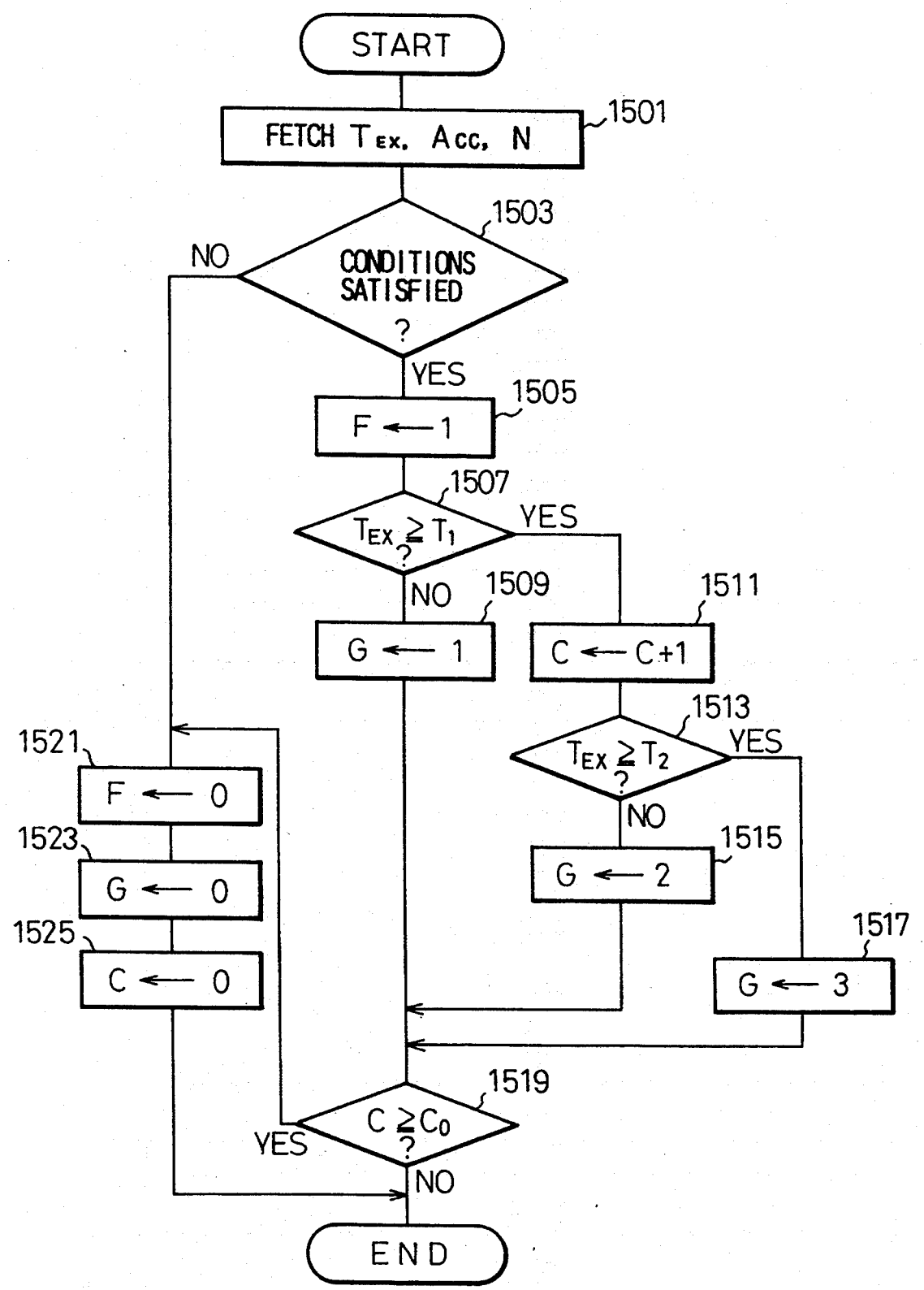

FIG. 15 is a flowchart showing an embodiment of the regenerating process of the $NO_x$ absorbent in the exhaust gas purification device in FIG. 11. This routine is executed at predetermined intervals by the control circuit 20 in FIG. 11.

In this embodiment, the regenerating process of the methods ① and ② are selected in accordance with the temperature of the $NO_x$ absorbent 1. Namely, the control circuit 20 monitors the temperature $T_{ex}$ of the exhaust gas downstream of the $NO_x$ absorbent 1 detected by the temperature sensor 12. When the temperature $T_{ex}$ is lower than or equal to a predetermined first value $T_1$, it is considered that the temperature of the $NO_x$ absorbent 1 is low and consequently, the time required to complete the regenerating process becomes longer. Therefore, the control circuit selects the above method ① to heat up the $NO_x$ absorbent 1 quickly by injecting the reducing agent continuously from the supply nozzle 4a.

On the other hand, when the temperature $T_{ex}$ is higher than the value $T_1$, the control circuit selects the above method ② to reduce the consumption of the reducing agent by injecting the reducing agent at predetermined intervals. Further, if the temperature $T_{ex}$ becomes higher than a predetermined second value $T_2$ (where, $T_2 > T_1$), since the temperature of the $NO_x$ absorbent 1 is sufficiently high to enable the regenerating process to be completed in a short time, the control circuit 20 reduces the amount of the reducing agent injected from supply nozzle 4a while still using the above method ② to thereby further reduce the consumption of the reducing agent.

In FIG. 15, when the routine starts, the exhaust gas temperature $T_{ex}$, accelerator pedal stroke $A_{cc}$ and the engine speed N are input from the respective sensors at step 1501. Then, at step 1503, it is determined whether or not the conditions for performing the regenerating process of the $NO_x$ absorbent 1 are satisfied. In this embodiment, the conditions for performing the regenerating process of the $NO_x$ absorbent are:

(A) The accelerator pedal stroke $A_{cc}$ is smaller than a predetermined value, and the engine speed N is more than a predetermined value at the same time (i.e., an engine brake operation is being performed).

(B) A predetermined time has lapsed since the regenerating process of the $NO_x$ absorbent 1 was last performed.

Only when both of the conditions (A) and (B) are satisfied, does the routine proceed to step 1505 to start the regenerating process of the $NO_x$ absorbent 1.

In this embodiment, since it is necessary to close the exhaust shutter valve 6 for regenerating the $NO_x$ absorbent 1 so that the exhaust gas inflowing into the $NO_x$ absorbent is reduced, the engine output torque decreases during the regenerating process of the $NO_x$ absorbent 1. Therefore, in this embodiment, to prevent the drivability from being impaired by a sudden change in the engine output torque, the regenerating process is performed only when the engine braking is being performed (above condition (A)).

Also, it is preferable to avoid a frequent regenerating process of the $NO_x$ absorbent to lower the consumption of the reducing agent. Therefore, in this embodiment, the regenerating process of the $NO_x$ absorbent is performed only when the $NO_x$ absorbent 1 has absorbed the $NO_x$ in the exhaust gas for more than a predetermined time (above condition (B)). Since the amount of the absorbed $NO_x$ in the $NO_x$ absorbent increases as the $NO_x$ absorbent absorbs $NO_x$ in the exhaust gas longer, it is assumed that the amount of the absorbed $NO_x$ in the $NO_x$ absorbent increased to the level that the capacity of the $NO_x$ absorbent for absorbing the $NO_x$ in the exhaust gas is lowered when the $NO_x$ absorbent has absorbed $NO_x$ in the exhaust gas more than a predetermined time. Therefore, the regenerating process of the $NO_x$ absorbent 1 is performed only when it becomes necessary in this embodiment, to prevent the capacity of the $NO_x$ absorbent 1 for absorbing the $NO_x$ from being lowered by an increase in the amount of the absorbed $NO_x$ in the $NO_x$ absorbent.

Also, instead of the above condition (B), it is possible to estimate the amount of the absorbed $NO_x$ in the $NO_x$ absorbent directly, and perform the regenerating process of the $NO_x$ absorbent 1 when the estimated amount of the absorbed $NO_x$ in the $NO_x$ absorbent 1 becomes larger than a predetermined value. In this case, the amount of the $NO_x$ generated by the engine 10 is obtained by experiment and stored in the ROM 21 in the control circuit 20 as a function of the engine operating load (i.e., the stroke of the accelerator pedal $A_{cc}$) and the engine speed N, and the amount of the $NO_x$ generated by the engine 10 is calculated at regular intervals from the values of $A_{cc}$ and N using the above function. Then the amount of the $NO_x$ absorbed by the $NO_x$ absorbent during the intervals of the calculation is estimated as the value of the amount of the $NO_x$ generated by the engine multiplied by a predetermined factor. Thus, the total amount of the absorbed $NO_x$ in the $NO_x$ absorbent 1 is obtained as a cumulative value of the amount of $NO_x$ absorbed by the $NO_x$ absorbent in each calculation period.

If both of the conditions (A) and (B) are satisfied at step 1503, then at step 1505, a flag F is set to be 1.

F is a flag for controlling the operation of the exhaust shutter valve 6, and when the value of the flag F is 1, the exhaust shutter valve 6 is operated to open and close at predetermined intervals by a routine (not shown) executed by the control circuit 20 at predetermined intervals.

Then, at step 1507, it is determined whether or not the exhaust gas temperature $T_{ex}$ is higher than or equal to the predetermined first value $T_1$. The value $T_1$ is set near the temperature at which the $NO_x$ absorbent enters an active state, and is determined in accordance with the types of the $NO_x$ absorbent (for example, $T_1$ is set at approximately 250° C. in this embodiment).

If the temperature $T_{ex}$ is lower than $T_1$ at step 1507, it is necessary to raise the temperature of the $NO_x$ absorbent 1 in a short time to activate the $NO_x$ absorbent 1. Therefore, the routine proceeds to step 1509 which sets the value of a flag G to 1. G is a flag for controlling the operation of the reducing agent supply control valve 4, and when the value of the flag G is 1, the reducing agent supply control valve 4 is opened to a predetermined degree continuously by another routine (not shown) executed by the control circuit 20. Thus, the reducing agent is injected from the supply nozzle 4a to establish the condition as shown in FIG. 12.

If the temperature $T_{ex}$ is higher than or equal to $T_1$ at step 1507, the routine proceeds to step 1511 which increases the value of the counter C by one. C is a counter representing the time having lapsed since the regeneration of the $NO_x$ absorbent 1 started. Then, at step 1513, it is determined whether or not the temperature $T_{ex}$ is higher than or equal to the predetermined second value $T_2$. Where, $T_2$ is a temperature at which the releasing action of the $NO_x$ absorbent 1 of the absorbed $NO_x$ becomes active, and in this embodiment, $T_2$ is set at approximately 400° C., for example.

When the temperature $T_{ex}$ is lower than $T_2$ at step 1513, the value of the flag G explained above is set to be 2 at step 1515. When the value of the flag G is 2, the reducing agent supply control valve 4 is operated by the above-mentioned routine in such a manner that the reducing agent supply control valve 4 opens and closes in accordance with the opening and closing action of the exhaust shutter valve 6. Thus, the reducing agent is injected intermittently in a synchronous manner as the opening action of the exhaust shutter valve 6 to establish the condition as shown in FIG. 13. Therefore, a further temperature rise of the $NO_x$ absorbent 1 is obtained while regeneration of the $NO_x$ absorbent 1 is performed at the same time.

If the temperature $T_{ex}$ is higher than or equal to $T_2$ at step 1513, since it is not necessary to raise the temperature of the $NO_x$ absorbent 1 further, the value of the flag G is set to be 3 at step 1517. When the value of the flag G is 3, the reducing agent supply control valve 4 is operated by the above-mentioned routine in such a manner that the amount of the reducing agent intermittently injected from the reducing agent supply nozzle 4a is reduced to a predetermined value which is smaller than the amount when the flag G is 2 at step 1515. Thus the consumption of the reducing agent during the regenerating process is lowered.

The steps 1521 through 1525 show the operation for terminating the regenerating process of the $NO_x$ absorbent 1. These steps are executed when the conditions for performing the regenerating process are not satisfied at step 1503, or the value of the counter C becomes larger than a predetermined value $C_0$ at step 1519 (i.e., when a predetermined time has lapsed since the regeneration of the $NO_x$ absorbent 1 started). The value $C_0$ corresponds to the number of the routine executed during the time required for regenerating the $NO_x$ absorbent 1, and is determined in accordance with the types and the sizes of the $NO_x$ absorbent.

When the steps 1521 through 1525 are executed, the values of the flags F and G are reset (i.e., to be zero) and the value of the counter C is cleared. When the value of the flag F is reset, the exhaust shutter valve 6 is locked at its fully opened position, and when the value of the flag G is reset, the reducing agent supply control valve 4 is locked to the closed position to stop the injection of the reducing agent from the reducing agent supply nozzle 4a.

In the above embodiment, the intervals of the opening and closing of the exhaust shutter valve 6 are maintained constant throughout the period of the regenerating process, however, the intervals of the opening and closing of the exhaust shutter valve 6 may be changed in accordance with the temperature of the $NO_x$ absorbent. For example, if the interval is set shorter when the temperature of the $NO_x$ absorbent is low, the mass of the reducing agent passes through the $NO_x$ absorbent at short intervals, and the $NO_x$ absorbent is heated more quickly since the oxidation of the reducing agent on the $NO_x$ absorbent occurs more frequently. Further, instead of opening and closing the exhaust shutter valve 6, it is possible to obtain the same effect by injecting the reducing agent at predetermined intervals while maintaining the opening angle of the exhaust shutter valve 6 constant.

Also, though the opening and closing actions of the exhaust shutter valve 6 and the reducing agent supply control valve 4 are performed at regular intervals, it is possible to control the opening and closing action of the exhaust shutter valve 6 (or reducing agent supply control valve 4) by other factors. For example, the opening and closing action of the exhaust shutter valve 6 (or reducing agent supply control valve 4) may be controlled by the output of an $O_2$ sensor which is disposed in the exhaust passage downstream of the $NO_x$ absorbent 1 and generates a signal corresponding to the oxygen concentration of the exhaust gas.

In this case, the exhaust shutter valve 6 is closed (or the reducing agent supply control valve 4 is opened) when the oxygen concentration detected by the $O_2$ sensor becomes higher than a predetermined value (for example, the value corresponding to the stoichiometric air-fuel ratio), and the exhaust shutter valve 6 is opened (or, the reducing agent supply control valve 4 is closed) when said oxygen concentration becomes lower than the predetermined value. Since the exhaust gas passes through the exhaust shutter valve 6, or the reducing agent injected from the reducing agent supply control valve 4, reaches the $O_2$ sensor after a certain time lag, by controlling the opening and closing action of the exhaust shutter valve 6 or the reducing agent supply control valve 4 in the manner explained above, the exhaust shutter valve 6 (or the reducing agent supply control valve 4) repeats the opening and closing action in accordance with the output of the $O_2$ sensor. Further, if the oxygen concentrations at which the valves are opened and the oxygen concentration at which the valves are closed are set at different levels, the average air-fuel ratio of the exhaust gas during the regenerating process can be maintained on the lean air-fuel ratio side compared to the stoichiometric air-fuel ratio to thereby reduce the consumption of the reducing agent during the regenerating process.

Further, though the carrier exhaust gas flow is generated by opening and closing the exhaust shutter valve 6 in the above embodiment, the carrier exhaust gas flow may be generated by a bypass passage connecting the exhaust passage upstream and downstream of the exhaust shutter valve. In this case, a bypass valve is provided in the bypass passage, and instead of the exhaust shutter valve, the bypass valve is opened and closed during the regenerating process to generate the carrier gas flow.

From the explanation set forth above, it will be understood that, according to the present invention, by generating the carrier gas flow passing through the $NO_x$ absorbent when the reducing agent is supplied, the regenerating process completes in a short time with smaller consumption of the reducing agent.

Although the invention has been described with reference to specific embodiments chosen for the purpose of illustration, it should be understood that numerous modifications could be applied by those skilled in the art without departing from the basic concept and scope of the present invention.

For example, though the embodiments set forth above describe the cases in which straight exhaust passage or two branch exhaust passages are employed, the present invention can be also applied to a case in which more than two branch exhaust passages are employed. Also, in the above embodiments, the exhaust gas purification device for a diesel engine in which a gas oil is used as the reducing agent is described. However, the present invention can be also applied to engines other than the diesel engine, or to an exhaust gas purification device in which another liquid or gaseous reducing agent is used.

We claim:

1. An exhaust gas purification device for an engine having an exhaust passage, said device comprising:
    a $NO_x$ absorbent disposed in the exhaust passage, said $NO_x$ absorbent absorbing a $NO_x$ component in the exhaust gas when an air-fuel ratio of the exhaust gas flowing into said $NO_x$ absorbent is lean, and releasing absorbed $NO_x$ in an atmosphere of lower oxygen concentration;
    a reducing agent supply device for supplying reducing agent to said $NO_x$ absorbent and producing an atmosphere of lower oxygen concentration in an area around said $NO_x$ absorbent to regenerate said $NO_x$ absorbent;
    an exhaust shutter valve disposed in said exhaust passage for closing the exhaust passage to stop the exhaust gas from flowing into said $NO_x$ absorbent during a regeneration process of said $NO_x$ absorbent wherein the reducing agent supply device supplies reducing agent to the $NO_x$ absorbent only when the exhaust shutter valve has closed the exhaust passage; and
    means for generating a carrier gas flow for carrying the supplied reducing agent through said $NO_x$ absorbent during said regeneration of the $NO_x$ absorbent.

2. An exhaust gas purification device according to claim 1, wherein the exhaust gas from said engine is used as said carrier gas.

3. An exhaust gas purification device according to claim 1, wherein air is used as said carrier gas.

4. An exhaust gas purification device according to claim 1, wherein said exhaust passage diverges into a plurality of branch exhaust passages, and wherein the exhaust gas purification device further includes a corresponding plurality of $NO_x$ absorbents, each $NO_x$ absorbent being disposed in a respective branch exhaust passage.

5. An exhaust gas purification device according to claim 1, wherein said exhaust passage is a straight exhaust passage without branchs, and a $NO_x$ absorbent is disposed in said straight exhaust passage.

6. An exhaust gas purification device according to claim 2, wherein said means for generating the carrier gas flow generates a continuous flow of the exhaust gas through said $NO_x$ absorbent during said regeneration of the $NO_x$ absorbent. disposed in said straight exhaust passage.

7. An exhaust gas purification device according to claim 2, wherein said means for generating the carrier gas flow generates an intermittent flow of the exhaust gas through said $NO_x$ absorbent(s) during said regeneration of the $NO_x$ absorbent(s).

8. An exhaust gas purification device according to claim 2, wherein said reducing agent supply device supplies the reducing agent to said $NO_x$ absorbent continuously during said regeneration of the $NO_x$ absorbent.

9. An exhaust gas purification device according to claim 2, wherein said reducing agent supply device supplies the reducing agent to said $NO_x$ absorbent intermittently during said regeneration of the $NO_x$ absorbent.

10. An exhaust gas purification device according to claim 6, wherein said means for generating the carrier gas flow comprises a means for enabling a predetermined amount of the exhaust gas flow to pass through said exhaust shutter valve when said exhaust shutter valve is closed.

11. An exhaust gas purification device according to claim 6, wherein said means for generating the carrier gas flow comprises a bypass passage bypassing said exhaust shutter valve and connecting a portion of the exhaust passage upstream of said exhaust shutter valve to a portion of the exhaust passage downstream of the exhaust shutter valve for enabling a predetermined amount of the exhaust gas to flow therethrough continuously when said exhaust shutter valve is closed.

12. An exhaust gas purification device according to claim 7, wherein said means for generating the carrier gas flow comprises bypass passage(s) bypassing said exhaust shutter valve(s) and connecting the exhaust passage upstream and downstream of said exhaust shutter valve(s), and generating intermittent flow of the passage(s), and generating intermittent flow of the exhaust gas by opening and closing said bypsass valve(s) when the exhaust shutter valve(s) are closed.

13. An exhaust gas purification device according to claim 7, wherein said means for generating the carrier gas flow comprises a means for opening and closing said exhaust shutter valve(s) during said regeneration of the $NO_x$ absorbent(s) so that the exhaust gas from said engine flows into said $NO_x$ absorbent(s) intermittently.

14. An exhaust gas purification device according to claim 3, wherein said means for generating the carrier gas flow generates a continuous air flow through said $NO_x$ absorbent(s) during said regeneration of the $NO_x$ absorbent(s).

15. An exhaust gas purification device according to claim 3, wherein said means for generating the carrier gas flow generates an intermittent air flow through said $NO_x$ absorbent(s) during said regeneration of the $NO_x$ absorbent(s).

16. An exhaust gas purification device according to claim 3, wherein said reducing agent supply device supplies the reducing agent to said $NO_x$ absorbent(s) continuously during said regeneration of the $NO_x$ absorbent(s).

17. An exhaust gas purification device according to claim 3, wherein said reducing agent supply device supplies the reducing agent to said $NO_x$ absorbent(s) intermittently during said regeneration of the $NO_x$ absorbent(s).

18. An exhaust gas purification device according to claim 4, wherein the exhaust gas from said engine is used as said carrier gas.

19. An exhaust gas purification device according to claim 4, wherein air is used as said carrier gas.

20. An exhaust gas purification device according to claim 18, wherein said exhaust shutter valves are disposed in each of said branch exhaust passages upstream of said $NO_x$ absorbents.

21. An exhaust gas purification device according to claim 18, wherein said exhaust shutter valves are disposed in each of said branch exhaust passages downstream of said $NO_x$ absorbents.

22. An exhaust gas purification device according to claim 18, wherein said exhaust shutter valves are disposed in each of said branch exhaust passages both upstream and downstream of said $NO_x$ absorbents.

23. An exhaust gas purification device according to claim 19, wherein said air and said reducing agent are supplied from the downstream side of said $NO_x$ absorbent and flow through said $NO_x$ absorbent in the direction opposite to the exhaust gas flow.

24. An exhaust gas purification device according to claim 23, wherein said exhaust shutter valves are disposed in each of said branch exhaust passages downstream of said $NO_x$ absorbents.

25. An exhaust gas purification device according to claim 23, wherein said exhaust shutter valves are disposed in each of said branch exhaust passages both upstream and downstream of said $NO_x$ absorbents.

26. An exhaust gas purification device according to claim 19, wherein said air and said reducing agent are supplied from the upstream side of said $NO_x$ absorbent and flow through said $NO_x$ absorbent in the direction of the exhaust gas flow.

27. An exhaust gas purification device according to claim 26, wherein said exhaust shutter valves are disposed in each of said branch exhaust passages upstream of said $NO_x$ absorbents.

28. An exhaust gas purification device according to claim 26, wherein said exhaust shutter valves are disposed in each of said branch exhaust passages both upstream and downstream of said $NO_x$ absorbents.

29. An exhaust gas purification device according to claim 5, wherein said exhaust shutter valves are disposed in each of said branch exhaust passages upstream of said $NO_x$ absorbents.

30. An exhaust gas purification device according to claim 5, wherein said exhaust shutter valves are disposed in each of said branch exhaust passages downstream of said $NO_x$ absorbents.

31. An exhaust gas purification device according to claim 5, wherein said exhaust shutter valves are disposed in each of said branch exhaust passages both upstream and downstream of said $NO_x$ absorbents.

32. An exhaust gas purification device according to claim 1, wherein said reducing agent supplied by said reducing agent supply device is a liquid reducing agent.

33. An exhaust gas purification device according to claim 32, wherein said reducing agent supplied by said reducing agent supply device is a liquid fuel of said engine.

* * * * *